United States Patent [19]

Inaba

[11] Patent Number: 4,676,706
[45] Date of Patent: Jun. 30, 1987

[54] CLIP NUT

[75] Inventor: Akio Inaba, Imaichi, Japan

[73] Assignee: Nifco, Inc., Yokohama, Japan

[21] Appl. No.: 876,997

[22] Filed: Jun. 19, 1986

[30] Foreign Application Priority Data

Jul. 5, 1985 [JP] Japan .......................... 60-101666[U]

[51] Int. Cl.⁴ .......................................... F16B 37/04
[52] U.S. Cl. .................... 411/175; 411/432; 411/970
[58] Field of Search ............. 411/103, 104, 105, 106, 411/111, 112, 113, 119, 172, 173, 174, 175, 432, 970

[56] References Cited

U.S. PATENT DOCUMENTS

| | | | |
|---|---|---|---|
| 2,394,729 | 2/1946 | Tinnerman | 411/970 X |
| 2,552,499 | 5/1951 | Tinnerman | 411/112 |
| 2,716,434 | 8/1955 | Crowther | 411/106 |
| 3,060,988 | 10/1962 | Munse | 411/103 |
| 3,478,801 | 11/1969 | Van Niel | 411/112 |
| 3,670,796 | 6/1972 | Grimm | 411/970 X |
| 3,999,583 | 12/1976 | Nelson | 411/970 X |
| 4,074,491 | 2/1978 | Bell et al. | 411/970 X |

FOREIGN PATENT DOCUMENTS

| | | | |
|---|---|---|---|
| 725965 | 1/1966 | Canada | 411/105 |
| 2162609 | 6/1973 | Fed. Rep. of Germany | 411/119 |
| 2311216 | 12/1976 | France | 411/112 |
| 2518195 | 6/1983 | France | 411/175 |
| 50-46854 | 5/1975 | Japan | 411/175 |

Primary Examiner—Thomas J. Holko
Attorney, Agent, or Firm—Trexler, Bushnell, Giangiorgi & Blackstone, Ltd.

[57] ABSTRACT

A clip nut comprises a body having a channel-shaped part having two opposed portions and an extension part united by a hinge portion to one of said opposed portions. The extension part has a nut retaining section, and it can be overlapped over one of the opposed portions with a nut accommodated in the nut retaining section. In this state, a panel is fitted in the space between the two opposed portions, and a bolt can be inserted through the channel-shaped part and panel and screwed into the nut.

2 Claims, 4 Drawing Figures

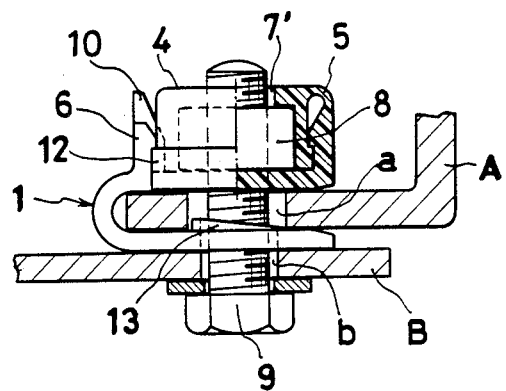
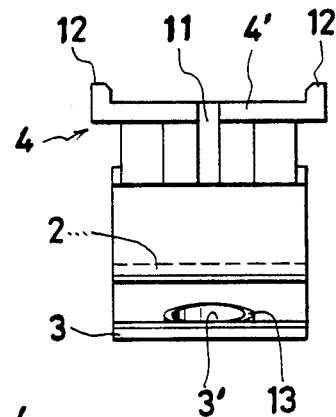
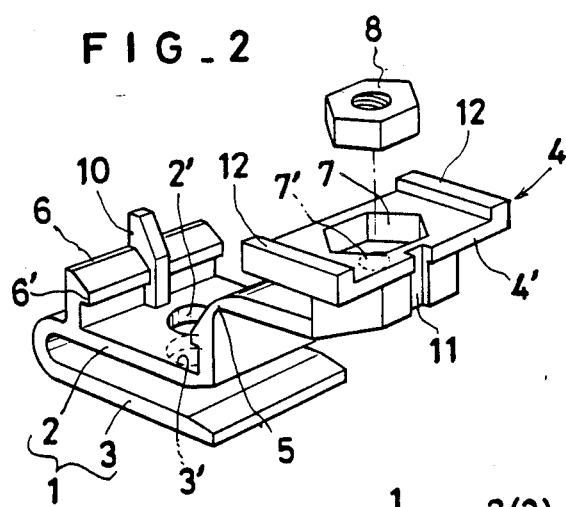
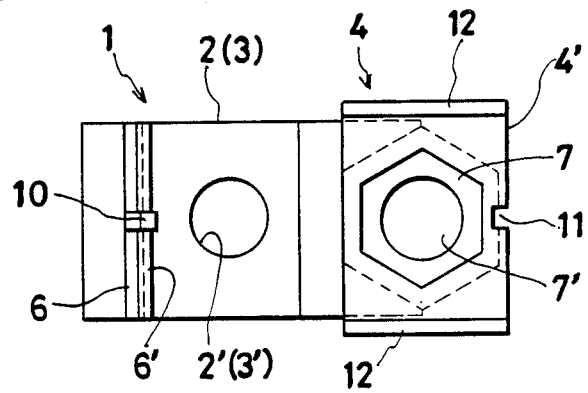

CLIP NUT

FIELD OF THE INVENTION AND RELATED ART STATEMENT

This invention relates to a clip nut for securing together a plurality of workpieces with a bolt and nut.

A well-known clip nut of the pertaining type is disclosed in Japanese Utility Model Public Disclosure No. SHO 50-46854.

This clip nut has a channel-shaped portion made from a steel plate. A panel is fitted in the space of the channel-shaped portion. A nut is mounted by welding on the outer surface of opposed portions of the channel-shaped portion.

The opposed portions of the channel-shaped portion have to be formed with a through-hole to be aligned to a bolt insertion hole formed in the panel. Since the channel-shaped portion is made from a steel plate, it is necessary to form the through-holes in the steel plate in a developed state thereof and then bend the steel plate into the channel-shaped form. Further, the nut has to be welded to the outer surface of one of the opposed portions by positioning the nut with respect to the through-holes. Therefore, the manufacture involves a large number of steps.

One conceivable way of reducing the number of required steps might be to mold the channel-shaped portion from a plastic material and integrally bury the nut by insert molding at a position corresponding to the through-holes of one of the opposed portions. In this case, however, the resin is liable to fill the female thread of the nut.

OBJECT AND SUMMARY OF THE INVENTION

An object on the invention is to provide a clip nut which can be readily formed as a one-piece plastic molding, easily permits assembly operation to retain a nut and reliably permits screwing of a bolt in the nut.

To attain this object of the invention, there is provided a clip nut consisting of a one-piece plastic molding having a channel-shaped part having two opposed portions and an extension part united by a hinge portion to one of the two opposed portions, the one-piece molding also having a locking portion for locking the extension part in a state overlapped over the outer surface of the aforesaid one of the opposed portions by folding the hinge portion and a nut retaining section to be aligned to the through-holes of the opposed portions when the extension part is overlapped, the locking portion and nut retaining section being provided between the one of the opposed portions and the extension part.

A nut is fitted in the nut retaining section, which is provided either on one of the opposed portions or on the extension part, and in this state the extension part is overlapped over the outer surface of the one opposed portion by folding the hinge portion. At this time, the extension part is locked in the overlapped state, and the nut retained in the nut retaining section is aligned to the through-holes formed in the opposed portions.

The above and other objects and features of the invention will become more apparent from the detailed description of a preferred embodiment thereof with reference to the accompanying drawings.

BRIEF DESCRIPTION OF THE DRAWINGS

FIG. 1 is a side view, partly in section, showing an embodiment of the clip nut according to the invention to illustrate the assembly and use of the same;

FIG. 2 is an exploded perspective view showing the same clip nut right after it has been molded;

FIG. 3 is a plan view showing the same clip nut; and

FIG. 4 is a front view showing the same clip nut viewed from the right side in FIG. 3.

DETAILED DESCRIPTION OF THE PREFERRED EMBODIMENT

Referring to the Figures illustrating an embodiment of the invention, reference numeral 1 designates a channel-shaped part having opposing portions 2 and 3, and numeral 4 an extension part united via a reduced thickness hinge portion 5 to the pertion 2 of the channel-shaped part 1. These parts are formed as a one-piece molding of a suitable plastic material. The extension part 4 can be overlapped over the outer surface of the portion 2 by folding the structure at the hinge portion 5. The opposed portions 2 and 3 have aligned through-holes 2' and 3'.

In this embodiment, a locking portion 6 is provided on the outer surface of the portion 2 so that the extension part 4 can be locked by the locking portion 6 when it is overlapped over the outer surface of the portion 2. The extension part 4 has a nut retaining section 7 which can be aligned to the through-hole 2' in the portion 2.

In this embodiment, the locking portion 6 is a flexible portion and has a hook 6' for hooking the free edge 4' of the extension part 4. When the extension part 4 is to be overlapped over the outer surface of the portion 2 by folding the hinge portion 5, the free edge 4' of the extension part 4 causes flexing of the flexible locking portion 6. But when the extension part 4 is closely overlapped over the outer surface of the poriton 2, the locking portion 6 restores to its initial state due to its elasticity, so that the free edge of the overlapped extension part 4 is hooked and locked by the hook 6'. The nut retaining section 7 has a recess which has the same size as a nut and is open on the surface of the extension part 4 that overlaps the outer surface of the portion 2. When the extension part 4 is overlapped, the recess is closed by the portion 2, whereby the nut 8 accommodated in the recess can no longer be detached. The extension part 4 has a hole 7' formed at the bottom of the recess noted above, which hole 7' is penetrated by a bolt 9 screwed through the nut 8.

The nut 8 is fitted in the recess of the nut retaining section of the extension part 4 when the clip nut is in the state shown in FIGS. 2 to 4. Then, the extension part 4 is overlapped over the outer surface of the portion 2 by folding the hinge portion 5, whereby the overlapped extension part 4 is locked by the locking portion 6, with the accommodated nut 8 aligned to the through-hole 2' of the portion 2.

A panel A and a workpiece B like a panel may be secured to each other using the clip nut described above, as shown in FIG. 1. More specifically, the panel A is inserted into the space between the opposed portions 2 and 3 of the channel-shaped part 1 with a hole a formed in it aligned to the holes 2' and 3'. Also, the workpiece B is held in contact with the outer side of the portion 3 with a hole b formed in it aligned to the hole 3'. In this state, the bolt 9 is inserted through the holes b, 3', a and 2' and screwed into the nut 8, whereby the panel A and workpiece B are secured to each other.

In this embodiment, the portion 2 is provided with an upright projection 10, while the extension part 4 is provided with a guide groove 11 which can fit on the projection 10. Further, the extension part 4 has ridges 12 provided on the side overlapped over the portion 2 such that the ridges 12 are in frictional contact with the opposite side surfaces of the portion 2. The extension part 4 can be correctly positioned on the outer surface of the portion 2 when it is overlapped by the projection 10, guide groove 11 and ridges 12.

While an embodiment of the invention has been shown, it is given for the purpose of illustration only and is by no means limitative.

For example, the locking portion 6 may be provided on the extension part 4. Also, the nut retaining section 7 may be provided on the outer surface of the portion 2. In this case, the extension part closes the nut retaining section provided on the portion 2 when it is overlapped thereover, so that it is provided with a hole 7' through which the bolt 9 penetrates.

Further, either one or both of the opposed surfaces of the opposed portions 2 and 3 may be provided with an inclined ring-like rigde 13 surrounding and extending from the edge of the hole 2' and/or 3'. In this case, when the panel A is inserted between the portions 2 and 3 and its hole a is aligned to the holes 2' and 3', the inclined ring-like ridge 13 is click fitted in the hole a to position the panel A.

According to the invention, the clip nut which consists of the channel-shaped part and extension part can be manufactured as a plastic one-piece molding with high precision and on a mass production scale. Further, by fitting the nut 8 in the nut retaining section 7 and then overlapping the extension part 4 over the outer surface of the portion 2 by folding the hinge portion 5, the extension part 4 is locked by the locking portion 6, so that the assembling operation can be readily done.

What is claimed is:

1. A clip nut comprising a body having a channel-shaped part having two opposed portions for sandwiching a panel inserted therebetween and having respective through-holes to be aligned to a through-hole formed in said panel and a nut disposed on the outer surface of one of said opposed portions and aligned to said through-holes, wherein:

said body is a one-piece plastic molding having said channel shaped part and an extension part united by a hinge portion to one of said opposed portions and having a free edge opposite said hinge portion, said body also having a locking portion for locking said extension part in a state overlapped over the outer surface of said one of said opposed portions by folding said hinge portion and a nut retaining section to be aligned to said through-holes of said opposed portions when said extension part is overlapped, said locking portion and nut retaining section being provided between said one of said opposed portions and extension part, portions of said extension part free edge and said locking portion for engagement with each other being provided with an upstanding projection and a guide groove to be engaged with each other.

2. A clip nut according to claim 1, wherein said extension part has ridges provided at the opposite edges, said ridges being for frictional contact with the opposite sides of said one of said opposed portions.

* * * * *